Oct. 25, 1955    K. S. HOOVER    2,721,821
PRINTED PLASTICS AND METHOD FOR PRODUCING SAME
Filed Feb. 2, 1951
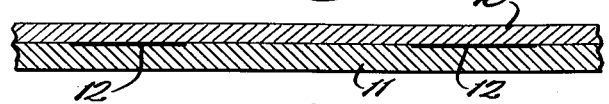
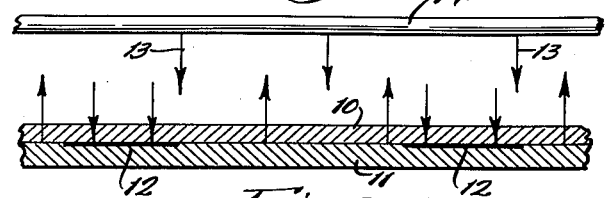
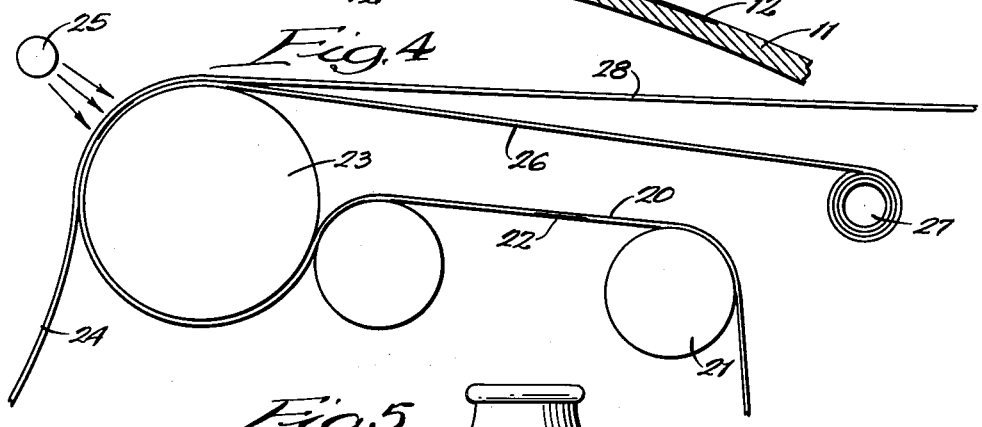
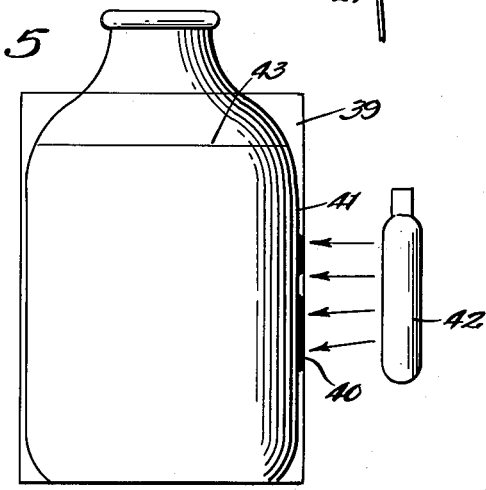
INVENTOR:
Keith S. Hoover,
BY
Dawson & Ooms,
ATTORNEYS.

//  # United States Patent Office 2,721,821
Patented Oct. 25, 1955

2,721,821

PRINTED PLASTICS AND METHOD FOR PRODUCING SAME

Keith S. Hoover, Elmhurst, Ill., assignor to A. B. Dick Company, Niles, Ill., a corporation of Illinois Application February 2, 1951, Serial No. 209,076

5 Claims. (Cl. 154—95)

This invention relates to a process for printing on surfaces of plastic material such, for example, as plastic films, sheet stock or molded products, and it relates particularly to printing on such plastic surfaces as are formed of polyethylene or other resinous materials of like character.

Polyethylene poses a peculiar problem in the printing and coating art because it is difficult to achieve proper anchorage of the printing or coating composition on the plastic surface. Most printing inks or coating compositions rely chiefly upon a physical type bond to adhere a printing or coating composition onto a plastic surface and often solvents capable of softening or etching the surface of the plastic material are employed in the printing or coating composition to provide for better anchorage and integration of the printing and coating composition with the surface of the plastic material. With polyethylene physical or chemical attraction is difficult to achieve and reliance on solvent integration is unsatisfactory because polyethylene is relatively unaffected by solvents. Its surfaces are so smooth that sufficient anchorage to resist removal of the coating composition as an incidence to normal handling is difficult to achieve. As a result, the industry has had to be content with polyethylene printed and coated products which are temporary in nature because the printing or coating composition could be easily rubbed off, scratched or lifted off. A test which is often employed with printing materials of the type described makes use of an adhesive tape, such as "Scotch Tape," for testing the adherence of the printing ink to the surface. In the past, the "Scotch Tape" test has been effective to remove substantially all of the printing ink or other resinous coating applied to surfaces of polyethylene.

It is an object of this invention to provide a method for permanently printing plastic surfaces, including surfaces of polyethylene, or other resinous materials of like character.

A further object is to provide a printing process of the type described which is not deleterious nor harmful to the characteristics and strength of the material upon which printing is carried out.

These and other objects and advantages of this invention will hereinafter appear and for purposes of illustration, but not of limitation, embodiments of the invention are shown in the accompanying drawing, in which:

Figure 1 is a schematic sectional elevational view of an arrangement of elements in accordance with the practice of this invention;

Figure 2 is a schematic view illustrating the technique for printing plastics with the arrangement shown in Figure 1;

Figure 3 is a schematic view in section showing the printed plastic in the process of being separated from the printing medium;

Figure 4 is a plan view showing continuous operation embodying features of this invention for printing plastic film; and Figure 5 illustrates the concept employed in printing on molded plastic surfaces, such as a blown plastic bottle.

In accordance with this invention, a carrier, such as a thin paper, cellophane or other sheet stock, preferably transparent or translucent, is printed or coated with an ink or coating composition and is positioned in surface contact with the plastic to be printed.

Radiant energy of sufficiently high intensity is directed onto the assembly whereby radiations are absorbed by the material in the printing ink and converted into heat. The heat generated in the ink composition is sufficient to modify, as by fusion or softening, the surface of the plastic material in surface contact therewith so that the ink or coating material may transfer from the carrier and become imbedded and/or integrated into the plastic surface to become a permanent part thereof.

The phenomenon of heat generation by absorption of radiant energy in the ink materials in accordance with this invention may be practiced with radiations rich in infra red. These include rays having a wave length ranging from 8,000 to 40,000 angstroms. Radiant energy capable of the phenomenon of the type described is developed most effectively in sufficiently high concentration by an ordinary flash bulb or by a tungsten filament lamp, carbon arc lamp, photographer's flash lamp and the like. The amount of heat developed upon absorption of radiant energy in the materials of the ink composition depends chiefly upon the duration of exposure, coupled with the intensity of the usable radiant energy from the light beams. The amount of heat developed also depends upon the color in the ink composition and the character of the materials of which it is formed. It has been found that colors of various types may be used in printing on plastic materials so long as the ink composition contains materials which absorb radiant energy and convert it into heat. Satisfactory use, for example, is made with ink compositions formulated of carbon black and the like. Temperature in the range of 250°–550° F., suitable for the practice of this invention, may be achieved in a fraction of a second with a photographer's flash lamp and slightly longer periods of exposure may be necessary for some of the other radiant energy sources.

As previously pointed out, printing as described herein relies on integration of the ink composition with the heat softened plastic surface, as distinguished from prior systems wherein softening of the plastic surface for ink integration is had by way of solvent attack, and is not to be confused with the use of heat systems, such as banks of infra-red ray lamps, for driving off the solvent and drying or setting the ink composition on a receptive base. The printed plastic produced in accordance with this invention may be handled almost immediately after printing and, therefore, the process is amenable to high speed continuous operation. In prior systems, it was necessary to force the evaporation of solvent or to await the natural evaporation thereof before the plastic material could be handled, otherwise the ink composition would smear and offset.

In accordance with the practice of this invention, only that portion of the plastic surface which is to be inked becomes heated up while the remainder, which usually covers a major portion of the surface, is relatively unaffected. This is to be distinguished from prior thermal treated surfaces wherein the entire surface of the plastic is necessarily raised to elevated temperature or elements for effecting the same for the purpose of setting a printing or coating composition thereon. Such overall heating of the plastic surface is undesirable because, under such conditions, the plastic is capable of flow and molecular rearrangement. If it is under molecular tension, shrinkage occurs and wrinkling and buckling are usually experienced. On the other hand, when only a minor portion of the surface is heated up to receive the ink composition, as in the practice of this invention, the remainder of the surface, which is unaffected, substantially maintains its original character. Blemishes which might occur in the printed portions which alone are heated up are substantially concealed by the imbedded ink composition.

The concepts of this invention are most valuable for printing polyethylene but they may also be practiced to advantage in the printing of other plastic surfaces formed of thermo-plastic materials, such as polystyrene, polytetrafluoroethylene, polyvinylidene chloride, rubber hydrochloride, styrene-isobutylene copolymer, styrene-acrylonitrile copolymer, polyvinyl chloride and copolymers thereof with vinyl chloride or vinyl acetate, polyvinyl acetals, vinyl chloride-vinyl acetate copolymers, polymethyl methacrylate and other polymethacrylates, cellulose ethers and esters, i. e. cellulose acetate, cellulose butyrate, ethyl cellulose, nitro cellulose and the like. It may also be practiced with surfaces of thermo-setting materials so long as the thermo-setting resin is still in the fusible stage, such for example as on surfaces formulated with phenol formaldehyde, urea formaldehyde, alkyd type resins and unsaturated polymerizable polyester resins.

It is preferable to formulate the ink composition with a heat sensitive or thermoplastic resinous or waxy base so that the ink composition will be reduced to a transferable condition at the elevated temperatures generated during radiation. Transfer of the color composition may result from the fact that the impression medium subject to the elevated temperatures, developed in the radiant energy absorbing heat generating material in the ink composition, provides a more receptive surface for the material of which the color composition is formulated so that transfer occurs substantially in toto upon heating up. Such physical transfer permits of the formulation of the color coating or ink composition of a base which need not necessarily be reducible to flowable condition under conditions of use. It will be apparent that colors other than black may be printed onto plastic surfaces in the manner described so long as ingredients therein are capable of absorbing radiant energy and converting it into heat of sufficient intensity. By way of further improvement, selected dyes and catalysts may be incorporated into the ink composition for the purpose of increasing the absorption of radiant energy and accelerating the conversion of the absorbed radiant energy into heat. Organic and/or inorganic converters capable of changing unusual light rays into heat generating rays for the purpose of developing higher temperature in shorter time may also be incorporated.

As shown in Figure 1, a polyethylene film 10 is disposed in surface contact with a sheet of paper 11 having printing ink 12 disposed thereon in an arrangement which is desired to be embodied in the plastic film.

Radiations 13 from a tungsten arc lamp 14 are directed upon the assembly shown in Figure 2 so that the radiations are substantially completely reflected by the unlinked portions of the printed paper while other radiations are absorbed by the material in the inked portion and converted into heat. The heat causes softening of the plastic surface in contact therewith and it also causes the reduction of the ink composition to flowable condition so that the ink may flow into the softened plastic surface and become integrated therewith.

When the paper 11 is stripped from the plastic film 10, as schematically illustrated in Figure 3, sufficient ink 15 remains imbedded in the plastic film to impart legibility. The ink so deposited is capable of resisting all presently known tests for its physical removal.

Figure 4 schematically illustrates a continuous process wherein a web of paper 20 fed from a roll 21 and having an inked surface 22 is passed about a roller 23 in combination with a strip 24 of plastic film fed from a separate source. The web 20 and the film 24 in surface contact with the inked surface are passed together beneath a source of radiant energy, such as a tungsten arc lamp 25.

The radiations from the lamp are absorbed by material in the ink composition and converted into heat whereby transfer of ink to the plastic film is achieved. Thereafter the spent web 26 may be rewound upon a collecting roll 27 while the printed film 28 of plastic material is advanced to another roll for packaging or else to other treating elements.

Since only a very small portion of the plastic film becomes heated, the temperature developed upon radiation is relatively unimportant except for the fact that it should be sufficient to reduce the ink composition to transferable condition in the event that it is dry and to soften the surface of the plastic so that the ink can be transferred and imbedded therein. It has been found that temperatures in the range of 250° to 550° F. may be developed upon exposure of fractions of a second up to two or three seconds by the techniques described and especially by the use of a photo flash lamp. Such temperatures are sufficient to achieve the desired results with most plastics. In the event that greater temperature is desired, the exposure of the web to radiant energy may be extended or the intensity of the light beam may correspondingly be increased. It is desirable, however, in the practice of this invention, to make use of radiant energy of sufficient intensity to provide for substantially instantaneous heating up so as to minimize the possibility of the heat spreading to adjacent areas or building up in undesirable areas. Rapid heating permits the printing of copy having good definition as compared to the ragged copy which results from slow heating.

As shown in Figure 5, a transparent film 39 printed with ink 40 is placed in surface contact with the side wall of a plastic bottle 41 blown from polystyrene, cellulose acetate, vinyl chloride, vinyl acetate copolymer or polyethylene, or other suitable plastic materials. The assembly is radiated by flashing a photographer's flash lamp 42 whereby radiations rich in infrared (arrows) are generated. The radiations are reflected by the unprinted surfaces of the plastic and film material and absorbed by the inked portion and converted into heat. The heat causes softening of the plastic surface against which the inked portion is disposed so that the ink may flow and become integrated into the wall of the bottle. In the event that the oriented nature of the plastic of which the bottle is formed tends to cause buckling of the plastic bottle responsive to the heat absorbed, cooling medium, such as water 43, may be poured into the bottle to maintain the major portion of the plastic surface at a temperature below flowable condition.

It will be apparent from the description that a new and novel means has been provided for printing on plastics and that such means may be used to advantage in printing on such materials as polyethylene and the like. The technique described is capable of continuous operation at high speed and involves little by way of additional equipment, so that it can be employed at distant stations and in small operations by all who desire to print on plastic surfaces.

Although transfer may be effected merely upon physical contact under the described conditions, it will be understood that more complete transfer will often result when the surfaces are pressed into more intimate contact during transfer which takes place upon radiation or almost immediately thereafter. Pressure not only insures more intimate contact to bring about sharper definition, but it appears that better anchorage often results because of deeper penetration.

It will be understood that numerous changes may be made in the details of the construction, arrangement and operation without departing from the spirit of the invention, especially as defined in the following claims.

I claim:

1. The method of printing on relatively non-infra-red ray absorbing thermoplastic material comprising the steps of positioning the plastic to be printed in surface contact with a carrier of relatively non-infra-red ray absorbing material in which the surface portion in contact with the plastic is inked with an infra-red ray absorbing-heat generating material as the image to be printed onto the plastic, directing radiations rich in infra-red onto the imaged carrier in amounts sufficient rapidly to build up a heat pattern corresponding to the inked areas which softens the corresponding portions of the thermoplastic material in contact therewith for anchorage of the inked image upon transfer from the carrier to the plastic surface while the non-imaged portions of the thermoplastic material remain substantially unaffected, and then separating the carrier from the imaged thermoplastic surface.

2. The method as claimed in claim 1 which includes the additional step of cooling the opposite side of the thermoplastic material during radiation to effect transfer of the ink image from the carrier to the plastic in surface contact therewith.

3. The process as claimed in claim 1 which includes the step of directing radiations of infra-red onto the imaged carrier in amounts to develop temperatures in the heat pattern within the range of 250–550° F. to effect at least surface fusion of the thermoplastic material in surface contact with the imaged portion of the carrier.

4. The method as claimed in claim 1 which includes the step of pressing the plastic material and image carrier together during radiation to effect more substantial contact between the adjacent surfaces.

5. The method of printing on polyethylene which is relatively non-infra-red ray absorbing comprising the steps of positioning the polyethylene in surface contact with a relatively non-infra-red ray absorbing carrier having an ink image containing infra-red ray absorbing-heat generating material on the surface portion in contact with the polyethylene to form the image to be printed onto the polyethylene, directing radiations rich in infra-red onto the inked carrier in amounts sufficient rapidly to build up a heat pattern corresponding to the inked areas which softens the portions of the polyethylene in surface contact therewith whereby the inked material transfers from the carrier to the polyethylene while the remainder of the polyethylene remains substantially unaffected, and then removing the carrier from the polyethylene having the ink image anchored thereon.

References Cited in the file of this patent

UNITED STATES PATENTS

| | | |
|---|---|---|
| 2,236,754 | Gurwick | Apr. 1, 1941 |
| 2,276,387 | Gurwick | Mar. 17, 1942 |
| 2,410,361 | France | Oct. 29, 1946 |
| 2,486,259 | Chavannes | Oct. 25, 1949 |
| 2,503,758 | Murray | Apr. 11, 1950 |
| 2,503,759 | Murray | Apr. 11, 1950 |
| 2,532,941 | Rado | Dec. 5, 1950 |
| 2,552,209 | Murray | May 8, 1951 |
| 2,594,290 | Chavannes | Apr. 29, 1952 |
| 2,632,921 | Kreidl | Mar. 31, 1953 |

FOREIGN PATENTS

| | | |
|---|---|---|
| 622,976 | Great Britain | May 10, 1949 |